United States Patent
> Winkler et al.

[15] 3,692,391
[45] Sept. 19, 1972

[54] PROJECTOR FOR USE WITH CONTAINERS FOR MOTION PICTURE FILM

[72] Inventors: Alfred Winkler, Munich; Johann Zanner, Jr., Unterhaching, both of Germany

[73] Assignee: AGFA Aktiengesellschaft, Leverkusen, Germany

[22] Filed: Dec. 17, 1970

[21] Appl. No.: 99,178

[30] Foreign Application Priority Data

Dec. 20, 1969 Germany..........P 19 64 006.3

[52] U.S. Cl. .........................352/123, 352/8, 352/72
[51] Int. Cl. ............................................G03b 21/04
[58] Field of Search .........352/123, 6, 8, 72; 242/192

[56] References Cited

UNITED STATES PATENTS

| | | | |
|---|---|---|---|
| 3,550,879 | 12/1970 | Bundschuh et al. | 352/123 |
| 3,561,853 | 2/1971 | Thevenaz | 352/123 |
| 3,480,354 | 11/1969 | Fukuda | 352/123 |
| 3,472,579 | 10/1969 | Schwartz | 352/123 |

Primary Examiner—Samuel S. Matthews
Assistant Examiner—Richard L. Moses
Attorney—Michael S. Striker

[57] ABSTRACT

The housing of a projector for use with cassettes for convoluted motion picture film defines a channel for lengthwise movement of shorter or longer trays which store stacks of cassettes. A blocking lever normally extends into the path of lengthwise movement of an inserted tray to arrest the tray in a starting position one step ahead of that position in which the foremost cassette in the tray is located in a projection position. The blocking lever is automatically moved away from the path of the inserted tray when the transporting mechanism which serves to move the tray lengthwise is operated in the starting position of the tray. The housing carries a pawl which engages a toothed portion of the inserted tray to prevent its movement in the rearward direction. The tray carries a pusher which causes the blocking lever to open a switch in the electric circuit of the projector when the transporting mechanism advances the tray beyond the starting position through such a distance that the rearmost cassette in a filled tray is moved beyond the projection position.

10 Claims, 1 Drawing Figure

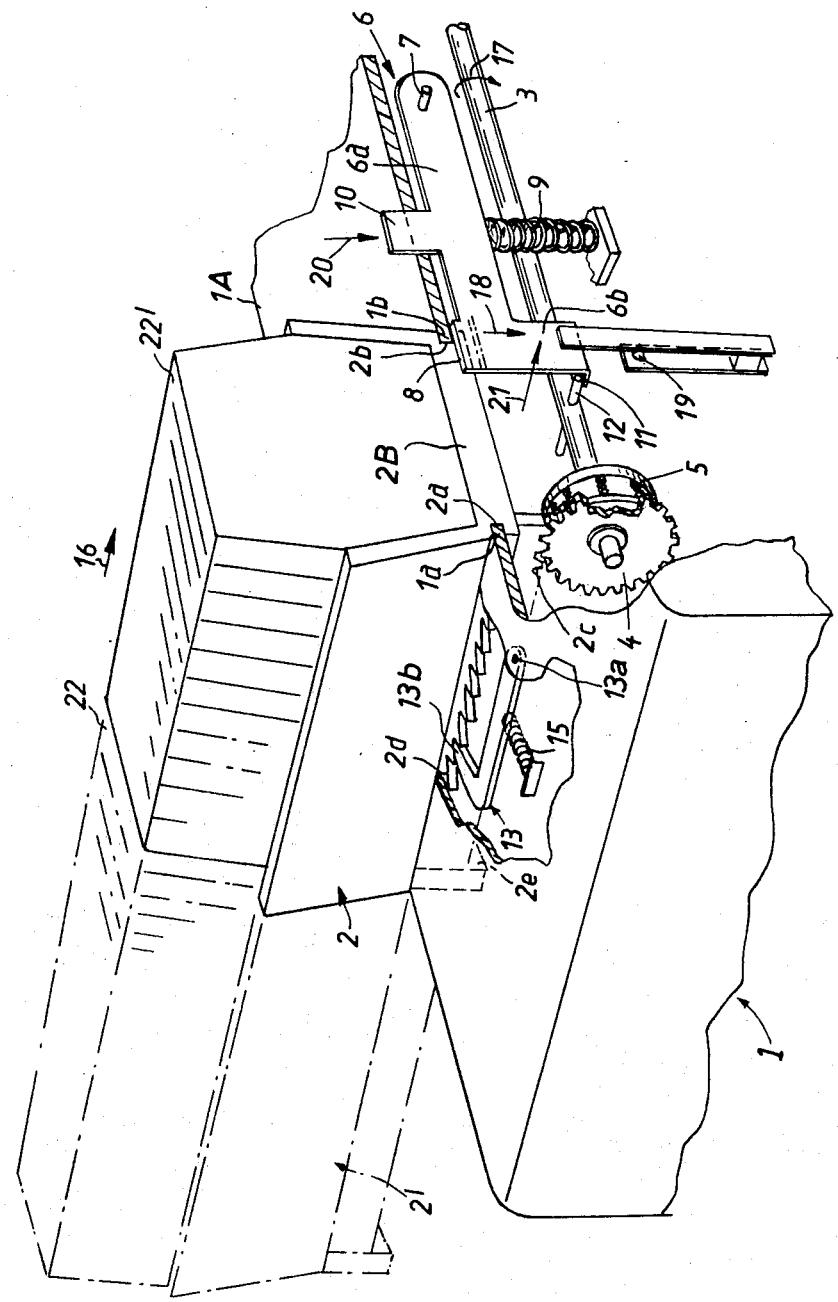

PROJECTOR FOR USE WITH CONTAINERS FOR MOTION PICTURE FILM

BACKGROUND OF THE INVENTION

The present invention relates to cinematographic apparatus in general, and more particularly to improvements in motion picture projectors. Still more particularly, the invention relates to improvements in projectors of the type which are designed to use containers or cassettes for rolls of convoluted motion picture film. The rolls of film must be moved to a predetermined projection position in which the film can be transported toward and convoluted on a takeup reel whereby the frames of the film pass through the projection gate so that the images of such frames are projected onto a screen or the like. Motion picture projectors of the just described type are preferred when a single roll of motion picture film does not suffice to photograph a complete sequence of related events, scenes or subjects. It is then desirable to rapidly advance successive rolls of film into projection position in order to reduce the intervals between projections of successive rolls to a minimum.

Certain types of presently known motion picture projectors can project images of frames on two or more rolls of motion picture film which is convoluted on the cores of reels. Such reels are mounted in a magazine which is movable with reference to the housing of the motion picture projector. The manipulation of reels for motion picture film presents many problems which can be eliminated if the film is stored in containers or cassettes.

SUMMARY OF THE INVENTION

An object of the invention is to provide a motion picture projector for use with cassettes or containers for motion picture film which can support shorter or longer stacks of cassettes, which insures that the foremost cassette in an inserted magazine or tray of stacked cassettes is invariably placed into a projection position when the operator so desires, and which can accept longer or shorter magazines or trays for cassettes containing convoluted motion picture film.

Another object of the invention is to provide the projector with novel means for initiating and controlling the movements of shorter, partially filled or completely filled trays for cassettes containing convoluted motion picture film.

A further object of the invention is to provide a projector for motion picture film wherein the magazine or tray for cassettes can automatically shut off the motor and/or open the circuit of the light source when the projection of images on the film which is stored in the rearmost cassette is completed.

The invention is embodied in a projector for use with cassettes or containers for motion picture film which comprises a housing or another suitable support defining an elongated path which is preferably horizontal and preferably horizontal and preferably extends between two parallel guide rails of the top wall of the projector housing, an elongated magazine or tray which can store a stack of cassettes for convoluted motion picture film and is insertable into and movable along the path in a predetermined direction toward the beyond a starting position which is one step away from that position wherein the foremost cassette is located in the projection position, a transporting mechanism which is mounted in the support and is operable, either by hand or by a motor, to advance the magazine beyond the starting position, and blocking means preferably comprising a lever which is pivotably mounted in or on the support and a portion of which normally extends into the path for the magazine so as to automatically arrest the magazine in the starting position. The transporting mechanism comprises displacing means which automatically moves the blocking lever from the path for the magazine when the transporting mechanism is operated while the magazine dwells in the starting position whereby the magazine is free to advance beyond the starting position and to place the foremost cassette into projection position.

Thus, if the foremost cassette is properly inserted into the magazine, it automatically reaches the projection position when the transporting mechanism is operated to advance the inserted magazine beyond its starting position. The support is designed in such a way that it can accept and guide magazines of different lengths.

The novel features which are considered as characteristic of the invention are set forth in particular in the appended claims.

The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary perspective view of a motion picture projector which embodies the invention, a shorter tray for cassettes being shown by solid lines and a longer tray being indicated by phantom lines.

DESCRIPTION OF THE PREFERRED EMBODIMENTS

The drawing illustrates a portion of a motion picture projector having a preferably low and flat housing or support 1 which can properly support a substantial number of containers or cassettes 22 for convoluted motion picture film. The top wall 1A of the housing 1 is provided with an elongated opening or channel flanked by two parallel horizontal guide rails 1a, 1b which can extend into longitudinally extending grooves 2a, 2b provided in the bottom wall 2B of an elongated trough-shaped magazine or tray 2 for a stack of cassettes 22. The elongated path for the properly inserted tray 2 is preferably normal to the optical axis of the lens system (not shown) of the projector. The manner in which the film can be withdrawn from or returned into a cassette 22 which is held in a projection position forms no part of the present invention.

The mechanism for transporting the tray 2 in stepwise fashion in the direction indicated by an arrow 16 comprises a horizontal shaft 3 which can be rotated automatically or by hand in the direction indicated by an arrow 17 and is normal to the path of movement of the tray. The transporting mechanism further comprises a pinion 4 which can be rotated by the shaft 3 through the intermediary of a friction clutch 5. The bottom wall 2B of the tray 2 is provided with an elongated rack 2c whose teeth mesh with the teeth of the pinion 4 as soon as the tray reaches the illustrated rearmost or starting position.

The means for arresting the tray 2 in the starting position in which the rack 2c is already in mesh with the pinion 4 of the transporting mechanism comprises a blocking lever 6 which is pivotable on a pin 7 fixedly mounted in the housing 1. The blocking lever 6 has an elongated arm 6a which is substantially parallel to the top wall 1A when the tray 2 is withdrawn from its channel, before the tray 2 reaches its illustrated starting position, and while the tray dwells in such starting position. The arm 6a has an upwardly extending projection or lug 8 which extends into the path of movement of the bottom wall 2B of the tray 2 and thus blocks further forward movement of the tray beyond the illustrated starting position. As shown in the drawing, the projection 8 bears against the guide rail 1b under the action of a helical spring 9 which biases the arm 6a in a clockwise direction and reacts against a portion of the housing 1. The arm 6a is further provided with a second upwardly extending projection 10 which extends through and beyond a slot in the top wall 1A and can be depressed by hand to pivot the arm 6a in a counterclockwise direction, as viewed in the drawing, in response to application of finger pressure in the direction indicated by an arrow 20.

A second arm 6b of the blocking lever 6 extends downwardly from the free end of the arm 6a and is provided with a bent-over lower end portion or follower 11 which is adjacent to the shaft 3. The arm 6b is preferably at least slightly elastic so that it can yield in the direction indicated by an arrow 21 to thereby actuate (open) an electric switch 19 in the circuit of the light source and/or motor of the motion picture projector. The shaft 3 carries a diametrically extending displacing pin 12 which can engage the follower 11 in response to rotation of the shaft 3 in the clockwise direction (arrow 17) to thereby pivot the blocking lever 6 counterclockwise and to move the projection 8 to a level below the path for the bottom wall 2B of the tray 2.

The projector is further provided with an arresting device for normally preventing rearward transport of the tray 2. This arresting device comprises a pawl 13 which is pivotable in the housing 1 about a vertical pin 13a and is biased in a clockwise direction by a helical spring 15 which reacts against the housing 1. The pallet 13b of the pawl 13 engages with the teeth of a longitudinally extending toothed or serrated portion 2d of the bottom wall 2B; this serrated portion 2d is parallel with and is located below the groove 2a. The configuration of the pallet 13b and teeth on the serrated portion 2d is such that the pawl 13 can ride over the teeth of the portion 2d when the tray 2 is advanced in the direction indicated by the arrow 16 but that the pawl positively prevents any movement of the tray in the opposite direction. However, it is clear that the pawl 13 can be coupled to or made integral with a manually operable handle (not shown) which enables the operator to disengage the pallet 13b from the serrated portion 2d.

The tray 2 is further provided with a transversely extending pusher 2e which extends downwardly from the rear end of the bottom wall 2B and can engage the projection 8 to thereby move the arm 6b of the blocking lever 6 in the direction indicated by arrow 21. The numeral 2' denotes a relatively long magazine or tray which can be inserted into the channel between the guide rails 1a, 1b upon withdrawal of the shorter tray 2.

The operation:

When the user desired to begin with the projection of images of frames on the film which is stored in the foremost cassette 22' of the shorter tray 2, the latter is inserted into the channel between the guide rails 1a, 1b in the direction indicated by the arrow 16 whereby the guide rails 1a, 1b respectively enter the grooves 2a, 2b of the bottom wall 2B. The operator pushes the tray 2 forwardly until the front end face of the bottom wall 2B reaches the projection 8 which is then held in the illustrated raised position. At such time, the teeth of the pinion 4 already mesh with the foremost teeth of the rack 2c, i.e., the tray 2 is properly coupled to the transporting mechanism of the projector. As mentioned above, the pallet 13b of the arresting pawl 13 can ride over successive teeth of the serrated portion 2d as long as the tray 2 is caused to move in the direction indicated by the arrow 16. It will be noted that the projection 8 of the arm 6a determines the starting position of the tray 2; in such starting position, the foremost cassette 22' in one step away from the projection position.

The operator thereupon rotates or causes the shaft 3 to rotate in the direction indicated by the arrow 17 whereby one of the projecting portions of the displacing pin 12 engages the follower 11 and pivots the lever 6 in a counterclockwise direction (arrow 18) to stress the return spring 9. At the same time, the clutch 5 rotates the pinion 4 so that the tray 2 moves forwardly and the bottom wall 2B slides over the projection 8. Thus, the lever 6 is automatically retained in an inoperative position because the bottom wall 2B prevents upward movement of the projection 8 so that the spring 9 continues to store energy and the shaft 3 can be rotated without any appreciable interference on the part of the follower 11.

The foremost cassette 22' is now located in the projection position and the blocking lever 6 remains in the inoperative position during successive stepwise advances of the tray 2 to place successive cassettes into the projection position. When the shaft 3 is rotated to move the rearmost cassette 22 beyond the projection position, the pusher 2e engages the projection 8 and moves the arm 6b of the blocking lever 6 in the direction indicated by the arrow 21. The arm 6b then opens the switch 19 which opens the circuit of the light source and/or the motor in the projector housing 1.

If the user wishes to skip a cassette 22 in the tray 2, the latter is pushed forwardly (arrow 16) by hand whereby the rack 2c rotates the pinion 4 which rotates with reference to the shaft 3. This is made possible by the provision of the friction clutch 5. This clutch need not offer a strong resistance to rotation of the pinion 4 with reference to the shaft 3.

As a rule, a tray whose length equals or approximates the length of the channel between the guide rails 1a, 1b can store a sufficient number of cassettes to permit the projection of images of a complete filmed sequence. This is desirable because a tray which is as long as the channel contributes to the eye-pleasing appearance of the projector. However, if it is desired to project the images of films which are stored in a very large number of cassettes 22, such cassettes are stacked in the longer tray 2' which is inserted and advanced in the same way as the tray 2. If the cassettes 22 in the longer tray 2' are properly stacked, the foremost cassette will be one step away from projection position when the front end face of the bottom wall of the longer tray 2' reaches the projection 8 of the blocking lever 6.

In order to withdraw the tray 2 from the projector, the user presses on the projection 10 of the arm 6a (arrow 20); this causes the projection 8 to move to a level below the lowermost portion of the pusher 2e so that the tray 2 can be readily withdrawn by moving in the direction indicated by the arrow 16. Withdrawal of the tray 2 in a direction counter to that indicated by the arrow 16 is normally prevented by the pawl 13 which cooperates with the teeth of the serrated portion 2d. As mentioned above, the pawl 13 can be provided with a handle which enables the operator to disengage the pallet 13b from the serrated portion 2d so that the tray 2 is then free to move out of the channel by advancing in the direction counter to that indicated by the arrow 16.

An important advantage of the blocking lever 6 is that the projection 8 of its arm can arrest in a starting position short, medium long or longest trays. This insures that the foremost cassette of the tray which is inserted into the channel between the guide rails 1a, 1b invariably assumes its projection position in response to rotation of the shaft 3 after the bottom wall of the inserted tray reaches the projection 8. It is clear that the tray 2 or 2' need not be completely filled with cassettes or that the cassettes which are stored in the tray 2 or 2' can contain convoluted film with pictures of two or more sequences.

The trays 2, 2' are preferably designed to accommodate commercially available cassettes for motion picture film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desire to be protected by Letters Patent is:

1. In a projector for use with cassettes for motion picture film, a combination comprising a support defining an elongated path; an elongated magazine for a stack of cassettes, said magazine being insertable into and being movable along said path in a predetermined direction toward and beyond a starting position; a transporting mechanism for said magazine, said mechanism being mounted in said support and being operable to advance the magazine beyond said starting position; and blocking means movably mounted in said support and normally extending into a predetermined portion of said path to arrest the magazine against further movement beyond said starting position, said transporting mechanism comprising displacing means arranged to move said blocking means away from said predetermined portion of said path in response to operation of said mechanism in the starting position of said magazine whereby said mechanism is free to move the magazine beyond said starting position, said magazine having means for preventing a return movement of said blocking means into said predetermined portion of said path as long as any portion of said magazine is located in said predetermined portion so that said blocking means can re-enter said path only when the magazine is moved beyond said predetermined portion.

2. A combination as defined in claim 1, wherein said blocking means comprises a lever which is pivotable with said blocking means comprises a lever which is pivotable with reference to said support.

3. A combination as defined in claim 1, further comprising at least one additional magazine whose length is different from the length of said first mentioned magazine, said additional magazine being insertable into said path upon withdrawal of said first mentioned magazine.

4. A combination as defined in claim 1, further comprising arresting means provided on said support for preventing movement of said magazine counter to said predetermined direction.

5. A combination as defined in claim 1, wherein said support constitutes the housing of the projector and comprises two elongated parallel guide rails which define said path.

6. A combination as defined in claim 1, wherein said magazine comprises pusher means for displacing said blocking means in response to movement of said magazine through a predetermined distance beyond said starting position, and further comprising electric switch means actuated by said blocking means in response to displacement of the blocking means by said pusher means.

7. In a projector for use with cassettes for motion picture film, a combination comprising a support defining an elongated path; an elongated tray for a stack of cassettes, said tray being insertable into and being movable along said path in a predetermined direction toward and beyond a starting position and having a longitudinally extending toothed rack; a transporting mechanism for said tray, said mechanism being mounted in said support and being operable to advance the tray beyond said starting position, said mechanism comprising a pinion rotatably mounted in said support and meshing with said rack not later than when the tray reaches said starting position; and blocking means movably mounted in said support and normally extending into said path to arrest the tray against further movement beyond said starting position, said transporting mechanism further comprising displacing means arranged to move said blocking means away from said path in response to operation of said mechanism in the starting position of said tray whereby said mechanism is free to move the tray beyond said starting position.

8. A combination as defined in claim 7, wherein said transporting mechanism further comprises a shaft rotatable in a preselected direction and a friction clutch for rotating said pinion in response to rotation of said shaft when the resistance offered by said pinion to rotation is below a predetermined value.

9. In a projector for use with cassettes for motion picture film, a combination comprising a support defining an elongated path; an elongated magazine for a stack of cassettes, said magazine being insertable into and being movable along said path in a predetermined direction toward and beyond a starting position and having a toothed portion; a transporting mechanism for said magazine, said mechanism being mounted in said support and being operable to advance the magazine beyond said starting position; blocking means movably mounted in said support and normally extending into said path to arrest the magazine against further movement beyond said starting position, said transporting mechanism comprising displacing means arranged to move said blocking means away from said path in response to operation of said mechanism in the starting position of said magazine whereby said mechanism is free to move the magazine beyond said starting position; and arresting means provided on said support for preventing a movement of said magazine counter to said predetermined direction, said arresting means comprising a pawl which is biased against said toothed portion of said magazine.

10. In a projector for use with cassettes for motion picture film, a combination comprising a support defining an elongated path; an elongated magazine for a stack of cassettes, said magazine being insertable into and being movable along said path in a predetermined direction toward and beyond a starting position; a transporting mechanism for said magazine, said mechanism being mounted in said support and being operable to advance the magazine beyond said starting position; and blocking means movably mounted in said support and normally extending into said path to arrest the magazine against further movement beyond said starting position, said transporting mechanism comprising displacing means arranged to move said blocking means away from said path in response to operation of said mechanism in the starting position of said magazine whereby said mechanism is free to move the magazine beyond said starting position, said blocking means comprising a portion which is accessible to and movable by the operator to thereby move said blocking means away from said path at the will of the operator.

* * * * *